(12) United States Patent
Cheung et al.

(10) Patent No.: US 8,739,031 B2
(45) Date of Patent: *May 27, 2014

(54) SYSTEM AND METHOD FOR TEXT TRANSLATIONS AND ANNOTATION IN AN INSTANT MESSAGING SESSION

(75) Inventors: Eric Cheung, New York, NY (US); Kermit Hal Purdy, Bernardsville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 841 days.

This patent is subject to a terminal disclaimer.

(21) Appl. No.: 12/194,231

(22) Filed: Aug. 19, 2008

(65) Prior Publication Data

US 2008/0313534 A1  Dec. 18, 2008

Related U.S. Application Data

(63) Continuation of application No. 11/030,924, filed on Jan. 7, 2005, now Pat. No. 7,451,188.

(51) Int. Cl.
 *G06F 17/21* (2006.01)
(52) U.S. Cl.
 USPC .......................................................... 715/261
(58) Field of Classification Search
 USPC .......................................................... 715/261
 See application file for complete search history.

(56) References Cited

U.S. PATENT DOCUMENTS

| | | | |
|---|---|---|---|
| 6,292,769 B1 | 9/2001 | Flanagan et al. | |
| 6,346,952 B1 | 2/2002 | Shtivelman | |
| 6,385,629 B1* | 5/2002 | Sundaresan et al. | 715/235 |
| 6,424,997 B1* | 7/2002 | Buskirk et al. | 709/206 |
| 6,477,551 B1* | 11/2002 | Johnson et al. | 715/202 |
| 6,563,514 B1* | 5/2003 | Samar | 715/711 |
| 6,629,793 B1* | 10/2003 | Miller | 400/472 |
| 6,677,976 B2 | 1/2004 | Parker et al. | |
| 6,785,869 B1* | 8/2004 | Berstis | 715/210 |
| 6,934,767 B1* | 8/2005 | Jellinek | 709/247 |
| 7,028,038 B1* | 4/2006 | Pakhomov | 707/765 |
| 7,136,876 B1* | 11/2006 | Adar et al. | 1/1 |
| 7,236,923 B1* | 6/2007 | Gupta | 704/9 |
| 7,366,500 B1* | 4/2008 | Yalovsky et al. | 455/414.1 |
| 7,475,343 B1* | 1/2009 | Mielenhausen | 715/261 |
| 7,503,001 B1* | 3/2009 | Lekutai | 715/261 |
| 7,660,846 B2* | 2/2010 | Albornoz et al. | 709/203 |
| 2001/0029455 A1* | 10/2001 | Chin et al. | 704/277 |
| 2002/0103914 A1* | 8/2002 | Dutta et al. | 709/229 |
| 2002/0178136 A1* | 11/2002 | Sundaresan et al. | 707/1 |

(Continued)

OTHER PUBLICATIONS

Terada et al., Automatic Expansion of Abbreviations by Using Context and Character Information (Information Processing and Management vol. 40, Elsevier Ltd., 2004) p. 31-45.*

*Primary Examiner* — Frank D Mills

(57) ABSTRACT

A system and method for translating received input from a sender to recipient in an instant messaging dialog is disclosed. The method comprises receiving instant messaging input from a sender for recipient, wherein the instant messaging input comprises at least one subculture specific term. A category is identified the defines a difference between the sender and the recipient and the received instant messaging input is modified from the sender by generating an output associated with the least one subculture specific term and based on the identified category. Multiple recipients in a chat session may also each receive a translated or annotated message according to characteristics of each individual recipient.

18 Claims, 3 Drawing Sheets

(56) References Cited

U.S. PATENT DOCUMENTS

| | | | |
|---|---|---|---|
| 2003/0139921 A1* | 7/2003 | Byrd et al. | 704/10 |
| 2004/0024822 A1* | 2/2004 | Werndorfer et al. | 709/206 |
| 2004/0102956 A1* | 5/2004 | Levin | 704/2 |
| 2004/0122979 A1* | 6/2004 | Kirkland | 709/247 |
| 2004/0222972 A1* | 11/2004 | Nguyen | 345/172 |
| 2005/0091198 A1* | 4/2005 | Dettinger et al. | 707/3 |
| 2005/0130685 A1* | 6/2005 | Jenkin | 455/466 |
| 2005/0163379 A1* | 7/2005 | Zimmermann | 382/190 |
| 2005/0171758 A1* | 8/2005 | Palmquist | 704/4 |
| 2005/0235031 A1* | 10/2005 | Schneider et al. | 709/203 |
| 2005/0240391 A1* | 10/2005 | Lekutai | 704/2 |
| 2006/0053386 A1* | 3/2006 | Kuhl et al. | 715/773 |
| 2006/0247914 A1* | 11/2006 | Brener et al. | 704/1 |
| 2008/0016142 A1* | 1/2008 | Schneider | 709/203 |

* cited by examiner

SYSTEM AND METHOD FOR TEXT TRANSLATIONS AND ANNOTATION IN AN INSTANT MESSAGING SESSION

The present invention is a continuation of U.S. patent application Ser. No. 11/030,924 filed Jan. 7, 2005 the contents of which is incorporated herein in its entirety.

BACKGROUND OF THE INVENTION

1. Field of the Invention
2. Introduction

The present invention relates to instant messaging. There are other applications similar to instant text messaging with invention may also apply. FIG. 1 illustrates the basic instant text messaging service. A person who sends an instant message is represented as a sender 102. The sender 102 may be using client software such as AOL® Instant Messenger. Messages are transmitted via a network such as the Internet 100 to a recipient 104. The messaging sessions instantly exchanges text input by the sender or recipient so that each may simultaneously follow the dialog.

Users of instant text messaging services (e.g. AOL Instant Messenger, Jabber, MSN Messenger) are often of diverse backgrounds. This may lead to difficulties in communicating with each other. The following are some causes of the difficulties: 1) When the sender and recipient speak different languages (e.g. English vs Spanish) it becomes a challenge to communicate via instant text messaging. When people all around the world can write to each other instantaneously, this exacerbates the language issue; 2) Widespread use of abbreviations that are often sub-culture specific, such as teenagers who use a lot of insiders' abbreviations, such as "lol" laugh out loud), "brb" (be right back) and so on. Others unaccustomed to these abbreviations often have difficulties understanding them; 3) Industry specific abbreviations, such as jargons and acronyms specific to the medical or legal profession, for example, are difficult for a layperson to understand. Furthermore, increasingly, instant text messaging is used for technical support and professional consultation and so on. In many cases the laypersons have difficulty understanding these technical jargons, medical terminology, legal terminology, etc.

Many companies that provide instant text messaging services will face the problem of the diversity background of people participating in an instant messaging session. This is a problem that plagues all users of instant text messaging systems. Such systems may be employed in an enterprise environment or in the consumer environment. Service providers and system application developers would all benefit from a solution to this problem.

Therefore what is needed in the art is a system and method that enables people of different backgrounds, who may speak a different language, or who may have different understandings of culturally specific abbreviations or other terms, to more easily communicate via an instant messaging session.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides for systems, methods and computer readable media for translating received input from a sender to recipient. The primary context of the invention is for such a translation during an instant messaging session. During an instant messaging session, the sender of a text message and the recipient of the text message may have diverse backgrounds. For example, a teenager may use the abbreviations "lol", which means "laugh out loud", and the recipient may be an adult who is unfamiliar with the subculture of instant messaging. Due to their unfamiliarity with the terms used, the adult may not understand the meaning of "lol".

Similarly, there may be many instances where two people communicating in an instant messaging context may not understand one another. Several examples include people who speak different languages, a professional communicating with a layperson such as a doctor to patient, and people from different cultures. The present invention provides for a translation and annotations system and method for instant text or other messaging services.

The method aspect of the invention provides for translating received input from a sender to recipient. Receiving the instant messaging input from the sender for the recipient, wherein the instant messaging input contains at least one subculture specific term. The method comprises identifying a category that defines a difference between the sender and the recipient and modifying the received instant messaging input from the sender by generating an output associated with the least one subculture specific term and based on the identified category. The message presented to the recipient preferably includes the original message entered by the sender plus the appropriate translations and/or annotations to enable the recipient to understand the subculture jargon.

On aspect of the invention relates to one-to-one chats or dialogs and another aspect of the invention may relate to multiple-recipient chat sessions. In this regard, the translations may vary depending on the characteristics of each recipient in the session.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention addresses the deficiencies in the prior art by providing for a language, abbreviation, acronym, group-specific terms, subculture-specific terms, graphical features and jargon translation and/or annotation in an instant messaging chat session that may be one-on-one or multi-recipient chat session. The invention may be described in several embodiments. The invention may be a system comprising at least one computing device, for example a web server, that controls the exchange of text and/or data between the first user and the second user in an instant messaging session. The computing device would comprise all the known hardware elements such as, a central processing unit, a bus, communication means, memory, and hard disk storage. A computer program running on the computing device interprets the data of the instant messages exchanged between the first and second user and performs intelligently appropriate translations and annotations to present a modified instant message to the recipient. The computing device may also control the exchange of information in a multi-recipient chat session. While the invention is primarily described as a one-on-one chat session, some discussion below will explain as well the multi-user context.

Figure 1:
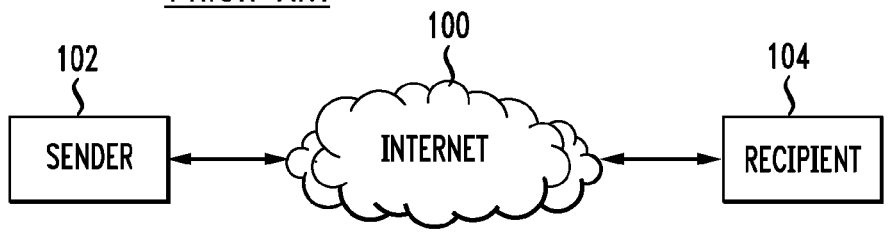
FIG. 1 illustrates a prior art instant messaging network.
Figure 2A:
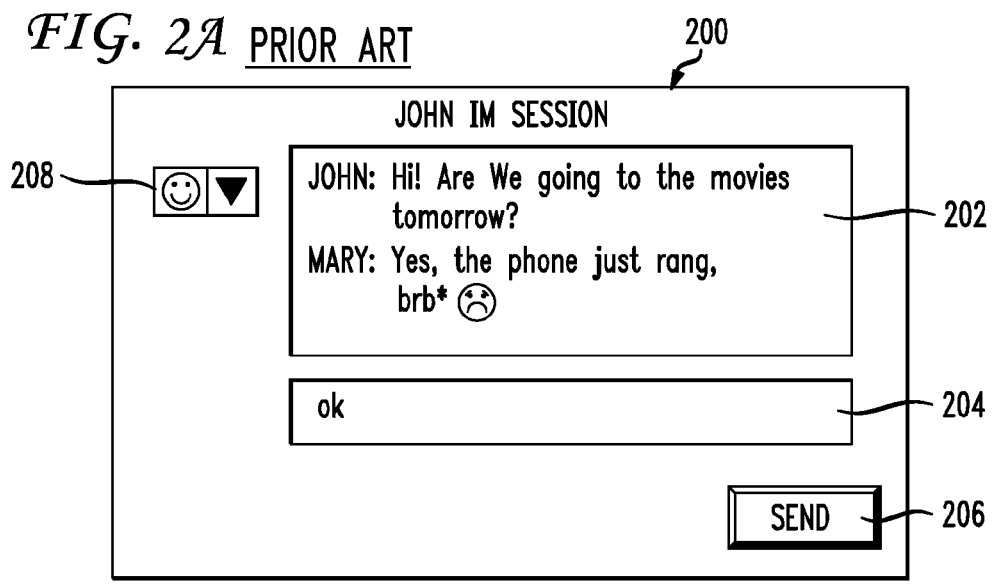
FIG. 2A illustrates a prior art window of an instant messaging session for a first user.

FIG. 2A illustrates an instant messaging window for user named John. The window 200 includes several standards features. Displayed area 202 includes the text of the instant messaging session. In this particular window John, submitted a message in input field 204 and clicked send button 206. Window 200 also includes a feature of using emoticons which are selectable from a menu shown as feature 208. An emoticon is an ASCII glyph used to indicate an emotional state in a message. Emoticons (or some other explicit humor indication) may be used in text-only communication forums where the lack of verbal and visual cues can cause misinterpretation of the message. One aspect of the invention enables translation of the text into the graphical glyph for the recipient where appropriate and which may reduce the possibility of misinterpretation or confusion.

In display area 202, Mary, the other person participating in the instant messaging session, has inserted the sentence "yes the phone just rang, brb". She has also inserted an emoticon with a frown. The term "brb" is instant messaging jargon for "be right back". It is a shorthand notation that is developed as a subculture term used mostly by teenagers who participate in instant text messaging sessions.

Figure 2B:
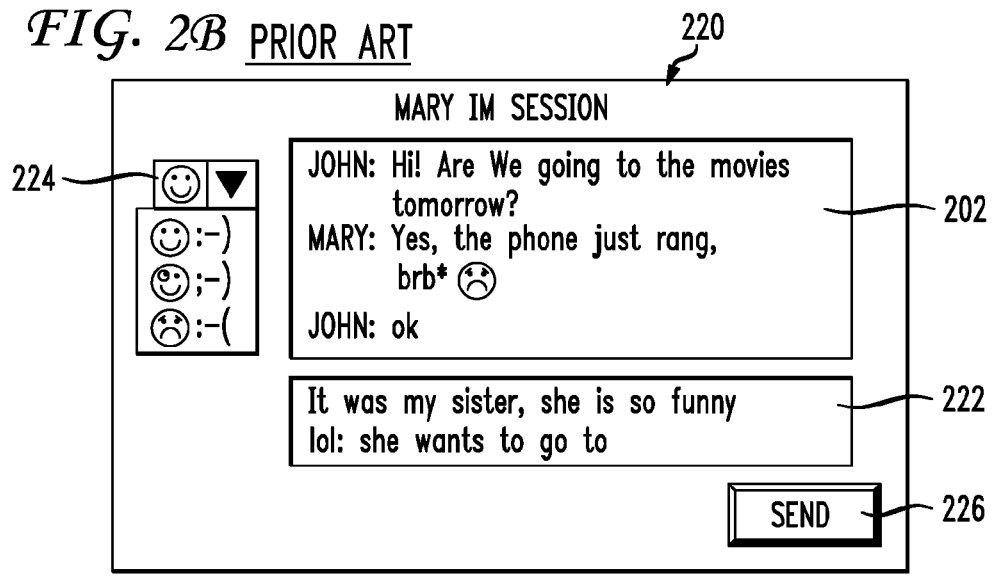
FIG. 2B illustrates a prior art window of an instant messaging session for a second user communicating with the first user.

FIG. 2B illustrates a window 204 Mary's instant messaging session. Display area 202 shows the same text as is shown in F*igure* 2A. Input text field 222 allows Mary to add further text as part of the dialog. A menu of emoticons are shown by feature 224 by entering text into field 204 and field 222, John and Mary can engage in an instant text messaging session and simultaneously exchange text, emoticons, abbreviations, acronyms, and other jargon common to instant messages.

As described above, one of the challenges of instant text messaging is the diverse backgrounds of the individuals participating in the session. For example, assume and John is a teenager. Further assume that Mary is an adult or someone who is unfamiliar with the instant messaging subculture of teenagers. In that case, Mary may not understand the jargon of instant messaging. The present invention addresses this challenge by providing a jargon translation in which Mary is able to have terms like "brb" and "lol" translated or expanded into text such as "be right back" and "laugh out loud". One aspect of the invention enables the translation to be from an acronym like "lol" into an emoticon such as those shown in FIG. 2B.

Figure 3A:
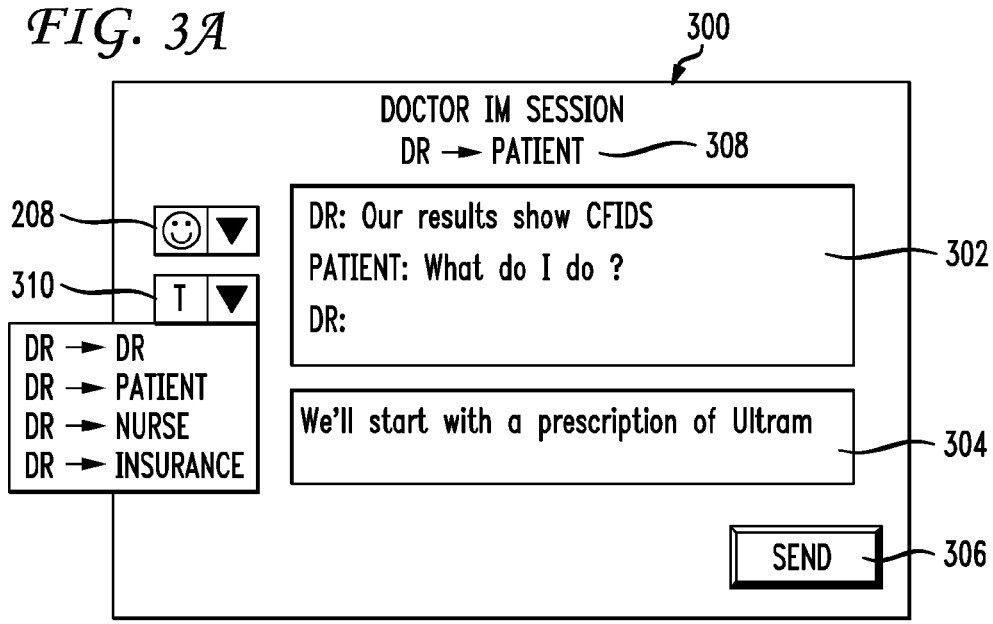
FIG. 3A illustrates an instant messaging window for a doctor communicating with a patient.
Figure 3B:
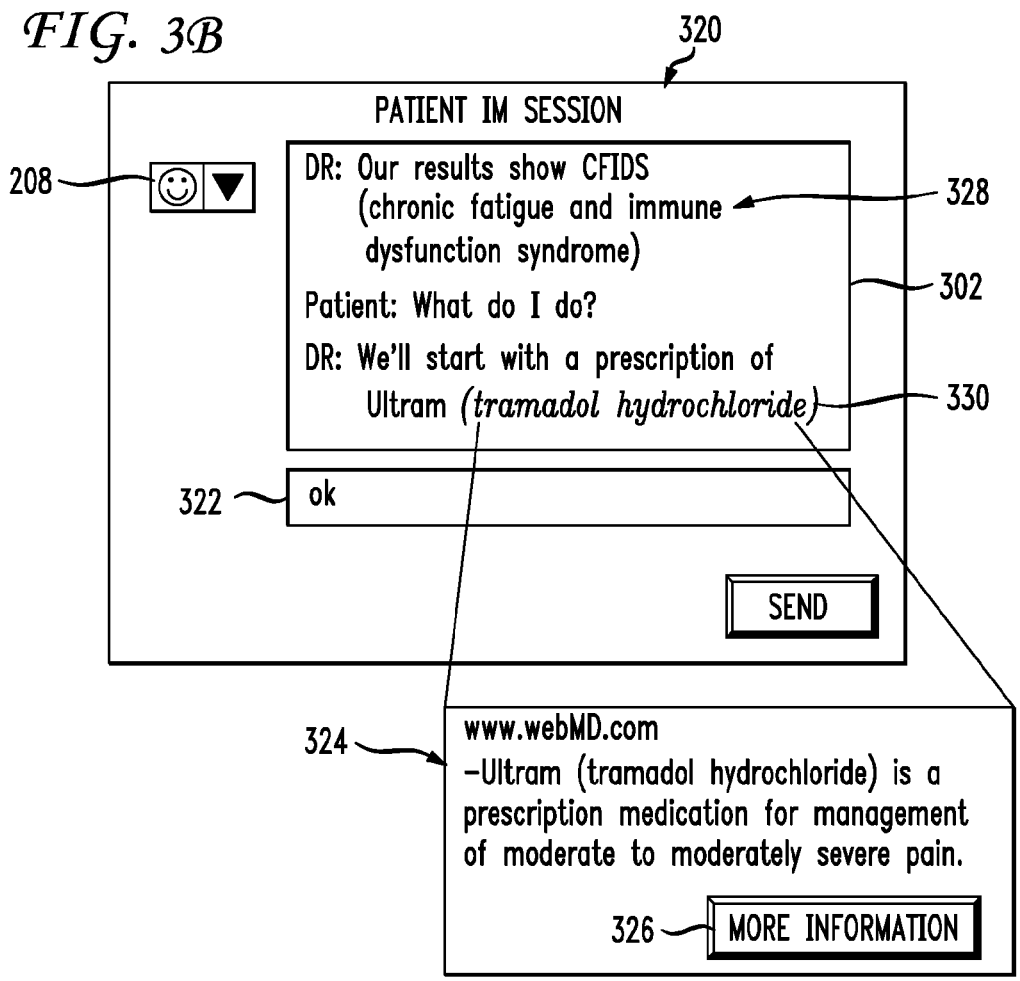
FIG. 3B illustrates an instant messaging window for the patient communicating with the doctor.

The invention is illustrated further in FIGS. 3A and 3B. As shown in FIG. 3A an instant messaging window 300 is for a doctor to communicate with a patient. Display 302 contains the text of the dialog and input fields for receiving the text input by the doctor. Emoticons may be available as shown by feature 208. An optional menu 310 shows a variety of options that described the diverse backgrounds between the doctor and the person with whom he or she is communicating. The options presented include doctor to doctor, doctor to patient, doctor to nurse, and doctor to Insurance Co. As shown in input fields 304, the doctor has stated "we'll start with a prescription of Ultram". Heading 308 shows that the doctor has selected a "doctor to patient" dialogue in which a data base will be accessed storing the appropriate translations of various words acronyms and jargon so the patient may receive clear communication. Here, the doctor has referenced the prescription drug called Ultram. The patient may not understand what this drug is and what its effects are immediately. As shown in window 302 the doctor has also stated that test results show the patient has CFIDS, which is chronic fatigue syndrome.

Buddy lists work in a similar manner to the doctor/patient example with the selection of who to chat with in a session. With buddy lists, the recipient is on the sender's buddy list and the relationship is already known when the instant message session is initiated. With buddy lists, predetermined translations may be employed for example if a teenager initiates a chat session with a friend speaking a foreign language or a grandparent. In this regard, the buddy list can have a user profile associated with each person that carries over from session to session and may be dynamically updated based on requested translations/annotations.

FIG. 3B shows the patient instant messaging session at window 320. This window shows the display 302 and the patient input field 322. This field 302 includes some of the features of the invention. For example, next to the text CFIDS, the system has input in parentheses the term "chronic fatigue and immune dysfunction syndrome" 328. This information is drawn from a data base and is inserted into the text of the instant messaging dialog. This text may only be shown to the patient is illustrated in figure is 3A and 3B, or alternatively may be shown in both the doctors and patients window 302. The choice of what to translate in the dialog is also based on the chosen category, here it is doctor to patient. For example, in a "doctor to nurse" category, the CFIDS and Ultram translation may or may not occur.

Also shown in window 302 in FIG. 3B, is a description of the medicine from which is shown Ultram and all hydrochloride 330. Furthermore, the system in this example has accessed the Internet, and queried the Internet to produce information presented in the form of data from the webMD.com Website 324. This information may be tailored by the data base and presented to the recipient and such a manner is to assist in understanding the jargon or abbreviation typed in by the doctor. The use of standard HTML links such as a button for more information 326 may also be employed. Therefore, the recipient may engage in a multimedia interactive experience as part of the dialog.

As can be appreciated, this invention enables a more robust means of communicating between people of diverse backgrounds. Furthermore the invention can enable a multimedia exchange of information that is originally based on jargon or at abbreviation based on a subculture understanding.

Figure 4:
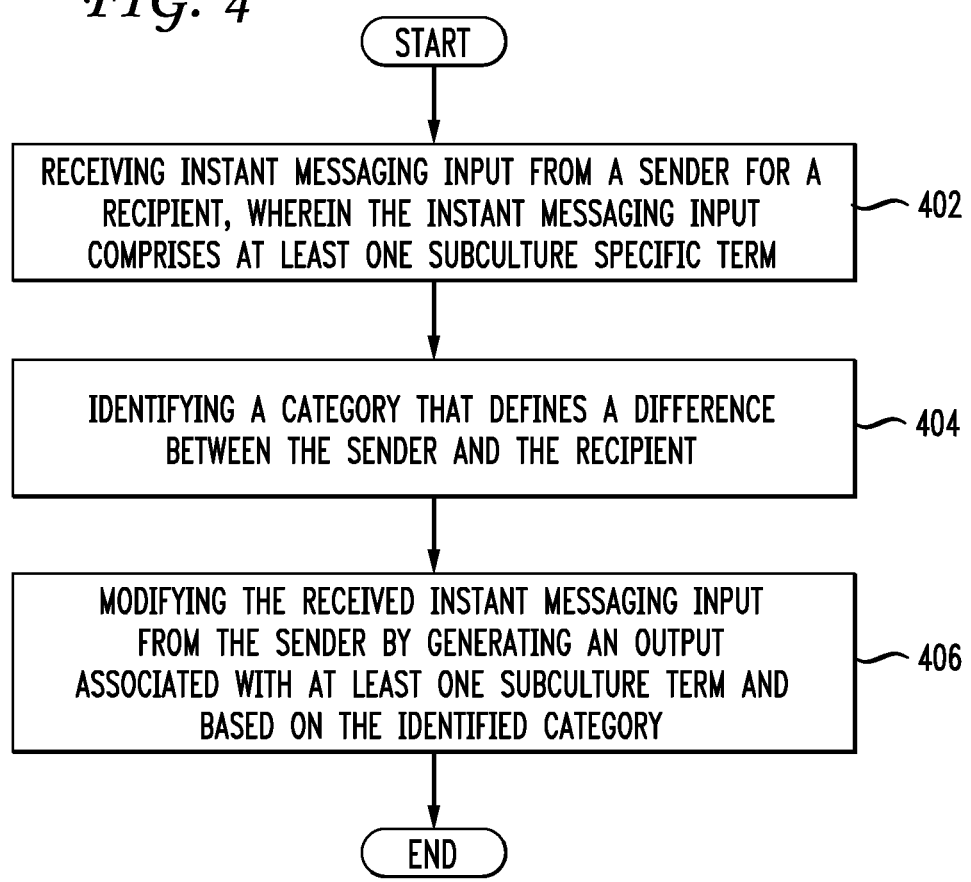
FIG. 4 illustrates a flow diagram of the method embodiment of the invention.

The method embodiment of the invention is shown by way of illustration in FIG. 4. The method comprises receiving instant messaging input from a sender for a recipient 402. The instant messaging input preferably comprises at least one subculture specific term, such as "lol" or a term that is specific for a professional in a field such as the medical field or the legal field. Next, the method comprises identifying a category that defines a difference between the sender and the recipient 404. A system that processes the steps of the invention may identify the category in a number of different ways. For example, the sender may control how the message is modified. In this regard, this sender may select a subculture category such as "I am talking to a teenager now" or in industry such as "I'm a doctor and I'm talking to a layman now". The sender may also select how translations occur. For example, the sender may select "user-defined translation" by expanding projected acronyms to full names or expand projected acronyms to the full meaning. Another example may be that a doctor may request (1) that acronyms or jargon for prescriptions may be both expanded upon in the text viewed by the recipient or (2) that an Internet interactive web page be presented to the recipient.

The recipient may also select how the translations and or annotation occurs. For example, the recipient may be an adult and in the course of an instant messaging session may see subculture abbreviations that the recipient does not understand. There may be an option presented wherein the recipient can request a translation and annotation which instructs the system to make a translation of those subculture terms. This may involve the recipient identifying what terms are unfamiliar wherein the system automatically identifies the difference between the sender and the recipient. In this regard if the recipient identifies the term "lol" as being unfamiliar, the system may be able to infer that the sender is a teenager and a recipient is an adult and make translations accordingly. The request by the recipient (or the sender) may be requested explicitly and interactively regarding what is to be annotated. For example, the recipient can select the text that requires annotation and press a button or click an icon on the user interface to achieve the annotation or translation. The recipient may also request a link to web data based on the selected text.

When the recipient selects text for translation as just described, feedback may be provided to the sender to notify the person or group of people that the recipient has difficulty understanding and requested annotation. This allows the sender to adjust the writing style to cater to the recipient better. The annotation may also provide for correction of spellings or other typographical errors and the addition of punctuation or other letters or figures within the text.

Another aspect of the invention relates to automatic learning by the system. In this regard, the system may monitor the dialog in the instant messaging session. Using active learning techniques known to those of skill in the art, the system may identify differences in the writing or speaking patterns of the sender and the recipient. The system may be able to identify the sender is a teenager who is using subculture jargon in the dialog. This may be accomplished for example by the use of subculture terms such as "brb" and "lol". This may also be accomplished by the use of certain emoticons in the dialog. Similarly, the system may identify that the recipient does not use such terms, or uses different subculture terms, wherein the system can learn or infer differences between the sender and recipient. If the system is set to utilize an automatic learning mode, the system then could automatically provide a translation and or adaptation to the text exchanged between the sender and the recipient. It is contemplated, that a feedback option is available wherein the sender or recipient may confirm that translation and annotation is desirable.

It is further contemplated, that if the sender and the recipient each use different sets of subculture jargon, that either by explicit selections of category or by the machine learning technique described above, bi-directional translation and/or annotation may occur. For example, if the sender is a teenager using teenagers subculture jargon, and the recipient is an adult using jargon specific to adults, then the system may automatically translate and annotate the jargon both from the sender and from the recipient in order to improve the understanding and communication by both parties.

The control function in the invention wherein the sender or the user can control how translated or annotated text is displayed may occur by interaction between the user and a client application such as an instant messaging application or a website. The user may also control the way in which the translated or annotated texts may be displayed. For example, the original message input and the translated and/or annotated modification may be displayed in a two-column format with the translated or annotated text side-by-side with the original text, or the translated and/or annotated text may be presented beneath the original text, or the annotation and/or translation may be added in line with the original text or the translation or annotation may be highlighted and in a different color or different font from the original text. The translation an/or annotation may replace the original text. Furthermore, the annotation may also be in the form of an HTML link with text or a multimedia presentation. This is particularly useful in the case where contents from a third-party content provider may be presented in the link. As shown above in FIG. 3B, the doctor text message to a patient that contains a disease name and a drug prescription is translated and annotated with content from a medical content provider such as webMD.com.

As mentioned above, another aspect of the invention relates to multi-recipient chat sessions. In this context, you may have one sender who is a teenager and a first recipient who is a teenager and a second recipient who is an adult and so forth. The translation/annotation explained above may be performed on an individual participant basis wherein the translation/annotation only would occur to the adult recipient. Another example is where an English speaking sender is chatting with an English speaking recipient and a Spanish speaking recipient. The translation would occur for the Spanish recipient only. Then the return message from the Spanish recipient would be translated for both English recipients. In this regard, the translations may be performed on a recipient-by-recipient basis according to each recipient's profile where there are multiple recipients in a chat session.

With the knowledge of the differences in culture and so forth for each of the participants in a chat or instant-messaging session, a service provider may also provide advertisements or promotional materials based on the content of the text messages and with knowledge of the translation/annotations requested or predetermined. This can help to tailor advertising to specific recipients and on an individual basis. For example, the teenager may get a different advertisement than the adult on the other end of the chat session.

With the features of translation and annotation discussed above, another aspect of the invention may be explored. There is a growing industry regarding personalized ring-tones for cell phones and handheld devices. These tones indicate when a telephone call is incoming for the user. A particular user can select from a variety of predetermined tones or create their own personalized ring-tone. In this aspect of the invention, a user can receive a plug-in predetermined or user-created module into an instant messaging communication or chatroom communication. As an example, the user could purchase or select an "Elmer Fudd" module to operate in an IM dialog. The user would then write "Roy, you're really weird". According to the particular characteristics of the plug-in module, the recipient of the message would receive "Woy, you're weally weird." In general, the translation would be to any chosen dialect or way of speaking that can be expressed with word choice or variant spellings of words. The plug-in module would receive and analyze the text of the sender and translate and/or annotate the text according to the parameters and characteristics of the module. These may be based on a personality like Elmer Fudd or John Wayne, or on cultural characteristics and so forth. These modules may be purchased or selected by the sender or receiver and dynamically applied to a chat session or IM dialog. The translations and annotations of the plug-in module would be a combination of at least one of word choice, spelling, grammar or punctuation. There may also be other effects seen or heard by the recipient according to the plug-in module. In other words, when the recipient sees "Woy, you're weally weird" a graphic or multimedia presentation may provide some kind of image to the recipient related to the personality of Elmer Fudd. Other translations besides text are also contemplated such as voice, video and multimedia translations in an exchange of data according to the principles set forth above.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Tangible computer-readable storage media, computer-readable storage devices, or computer-readable memory devices, expressly exclude media such as transitory waves, energy, carrier signals, electromagnetic waves, and signals per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. In this regard, the embodiment may be a network-based server, or the sender's system or the recipient system may practice all or a portion of the functionality of the invention. Further, a combination of one or more of these components may operate together to practice the invention.

Although the above description may contain specific details, they should not be construed as limiting the claims in any way. Other configurations of the described embodiments of the invention are part of the scope of this invention. The preferred embodiment of the invention is in the context of a text instant messaging application and user-to-user or multi-user chat sessions but other contexts are contemplated as well. Accordingly, the appended claims and their legal equivalents should only define the invention, rather than any specific examples given.

We claim:

1. A method comprising:
receiving text, wherein a portion of the text comprises an abbreviation;
associating a sender of the text with one of a plurality of groups, to yield a sender group;
associating a recipient of the text with one of the plurality of groups, to yield a recipient group; and
upon determining a difference in the sender and the recipient group, wherein the different indicates distinct cultures of the sender and the recipient:
expanding, via a processor, the abbreviation based on the distinct cultures, to yield expanded text;
transmitting a message to the recipient which comprises the abbreviation and the expanded text;
modifying, via the processor, a display presented to the sender in which the expanded text is added to the text having the abbreviations; and
presenting a first advertisement to the sender based on the text and the sender group, wherein the first advertisement is distinct from a second advertisement presented to the recipient.

2. The method of claim 1, wherein expanding the abbreviation comprises substituting a graphical feature representing the abbreviation.

3. The method of claim 1, wherein the expanded text is a group-specific term related to the selected group.

4. The method of claim 3, wherein the plurality of groups comprises a medical group, a legal group, an engineering group, a technical support group, and a youth sub-culture group.

5. The method of claim 1, wherein expanding the abbreviation is sender-selectable.

6. The method of claim 1, wherein expanding the abbreviation is recipient-selectable.

7. The method of claim 1, wherein expanding the abbreviation is controlled in a network.

8. The method of claim 1, wherein the abbreviation and expanded text are presented to the recipient side-by-side.

9. The method of claim 1, further comprising:
presenting a new window to the recipient with information associated with the expanded text.

10. The method of claim 9, wherein the new window comprises information from a website.

11. The method of claim 1, further comprising annotating the expanded text to yield an annotation and transmitting the annotation with the expanded text.

12. The method of claim 11, wherein annotating the expanded text comprises one of: presenting the expanded text in a different color, presenting the expanded text in a different font, presenting the expanded text with a graphical image, presenting the expanded text with additional information associated with the expanded text, presenting the expanded text with a multimedia presentation associated with the expanded text, presenting the expanded text with an audio presentation associated with the expanded text, and presenting the expanded text with an interactive multimedia presentation to the recipient.

13. A system comprising:
a processor; and
a computer-readable medium having stored therein instructions which, when executed by the processor, cause the processor to perform operations comprising:
receiving text, wherein a portion of the text comprises an abbreviation;
associating a sender of the text with one of a plurality of groups, to yield a sender group;
associating a recipient of the text with one of the plurality of groups, to yield a recipient group; and
upon determining a difference in the sender group and the recipient group, wherein the difference indicates distinct cultures of the sender and the recipient:
expanding, the abbreviation based on the distinct cultures, to yield expanded text;
transmitting a message to the recipient which comprises the abbreviation and the expanded text;
modifying, via the processor, a display presented to the sender in which the expanded text is added to the text having the abbreviation; and
presenting a first advertisement to the sender based on the text and the sender group, wherein the first advertisement is distinct from a second advertisement presented to the recipient.

14. The system of claim 13, wherein expanding the abbreviation further comprises substituting a graphical feature representing the abbreviation.

15. The system of claim 13, wherein the expanded text is a group-specific term related to the selected group.

16. The system of claim 15, wherein the plurality of groups comprises a medical group, a legal group, an engineering group, a technical support group, and a youth sub-culture group.

17. The system of claim 13, wherein expanding the abbreviation is one of: sender-selectable, recipient selectable and controlled in a network.

18. A computer-readable storage device having instructions stored which, when executed by a processor, cause the processor to perform operations comprising:
receiving text, wherein a portion of the text comprises an abbreviation;
associating a sender of the text with one of a plurality of groups, to yield a sender group;
associating a recipient of the text with one of the plurality of groups, to yield a recipient group; and
upon determining a difference in the sender group and the recipient group, wherein the difference indicates distinct cultures of the sender and the recipient:
expanding, the abbreviation based on the distinct cultures, to yield expanded text;
transmitting a message to the recipient which comprises the abbreviation and the expanded text;
modifying, via the processor, a display presented to the sender in which the expanded text is added to the text having the abbreviation; and
presenting a first advertisement to the sender based on the text and the sender group, wherein the first advertisement is distinct from a second advertisement presented to the recipient.

* * * * *